Aug. 13, 1935.   B. G. KLUGH   2,011,055
EXTRUDER AND METHOD OF EXTRUDING
Filed Oct. 7, 1931   2 Sheets-Sheet 1
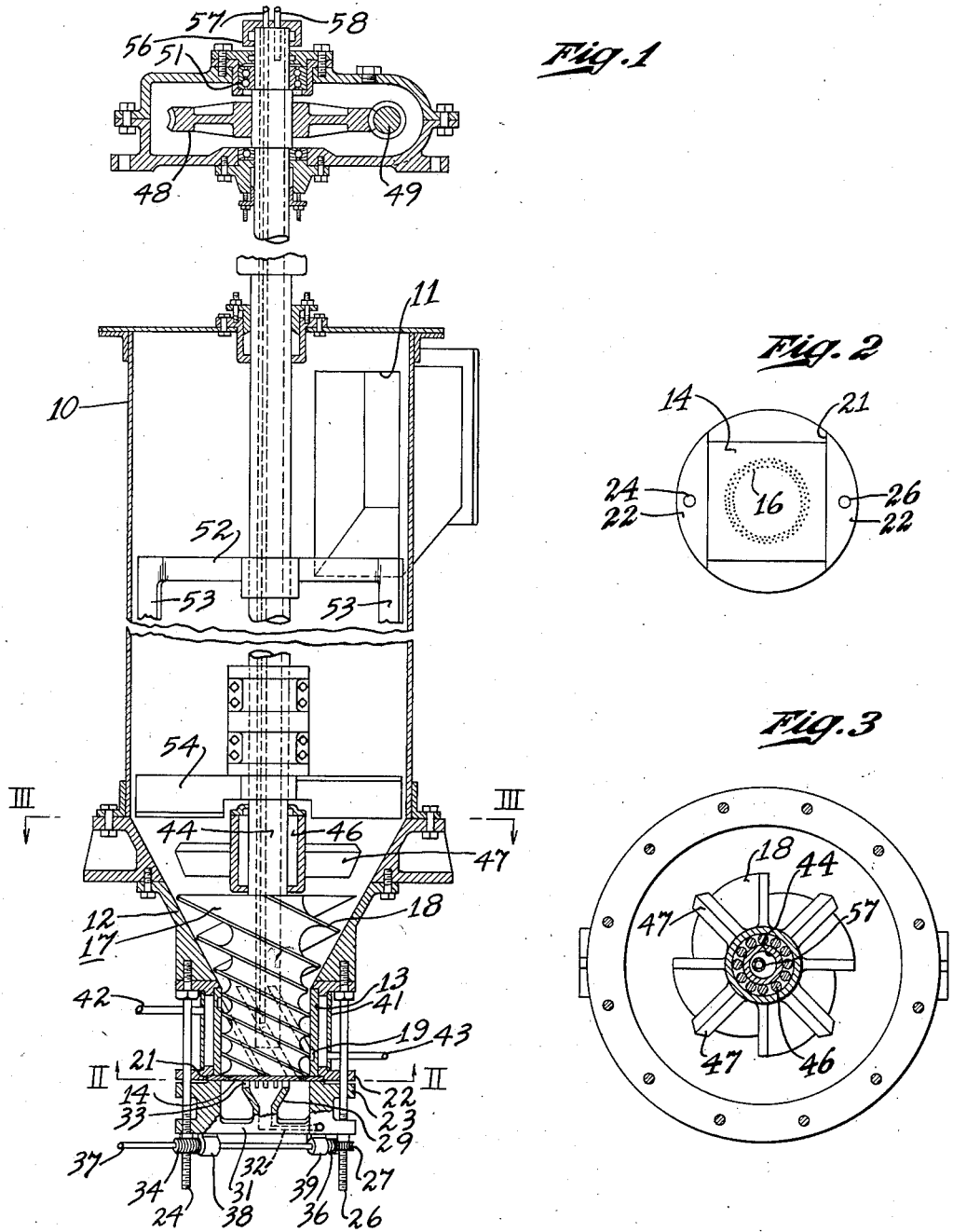
INVENTOR
B. G. Klugh
BY
Johnston & Jennings
ATTORNEYS

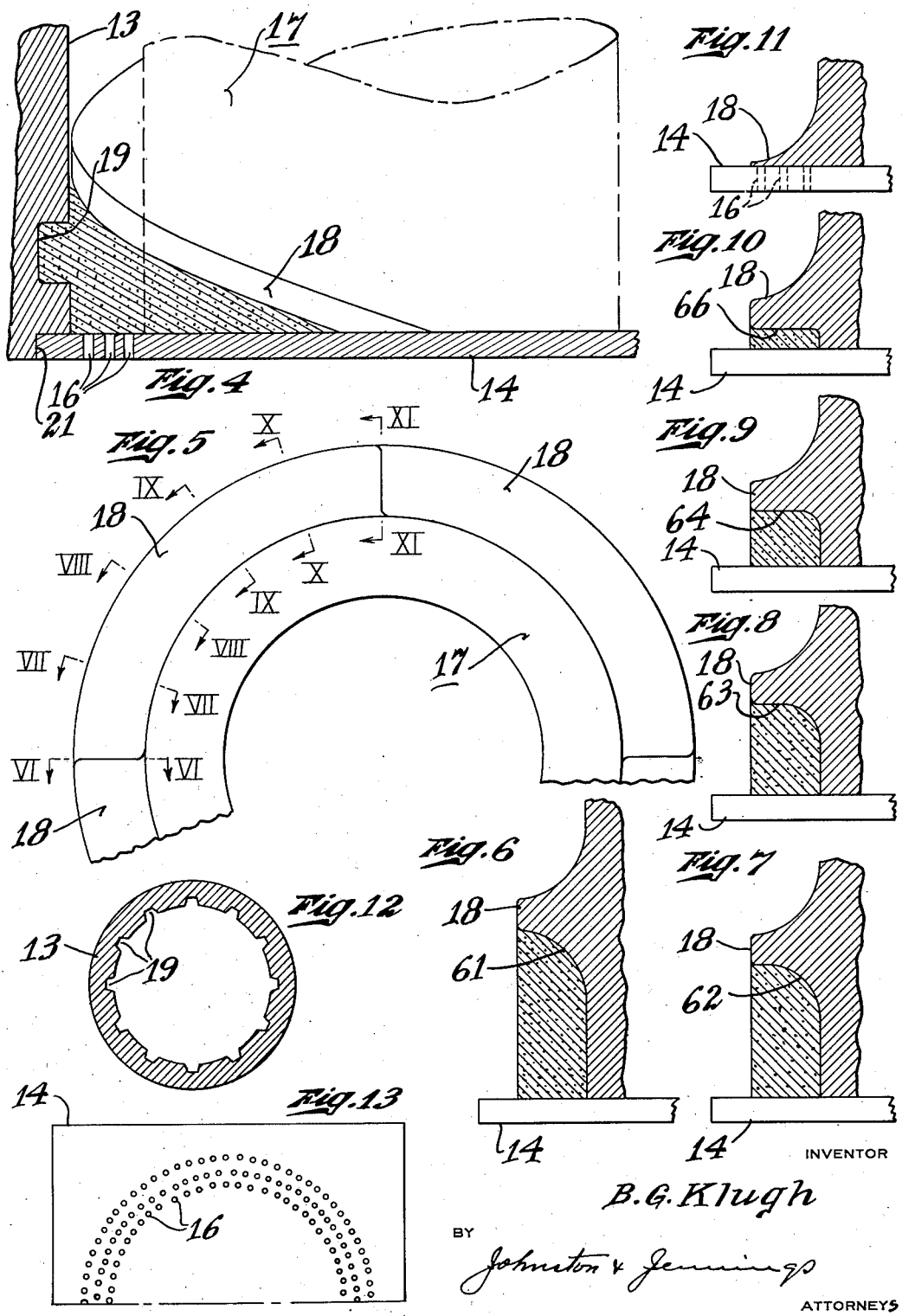

Patented Aug. 13, 1935

2,011,055

UNITED STATES PATENT OFFICE 2,011,055

EXTRUDER AND METHOD OF EXTRUDING

Bethune G. Klugh, Birmingham, Ala., assignor to Swann Fertilizer Company, a corporation of Delaware Application October 7, 1931, Serial No. 567,438

18 Claims. (Cl. 18—12)

My invention relates to a method and apparatus for extruding salt pastes, more particularly salt pastes formed from finely comminuted salts and mixtures thereof, with sufficient moisture incorporated therein to form a plastic mass of salts in their solutions.

A particular object of my invention is the provision of a method and apparatus of the character designated which shall be effective to extrude salt pastes through a perforated plate and form them into dense, cylindrical particles of uniform diameter and homogeneous consistency.

A further object of my invention is to provide an apparatus for extruding salt pastes which shall be simple and sturdy of design, reliable in operation and which shall be effective to extrude salt pastes with avoidance of the natural tendencies of the salts to separate from their solutions when the said pastes are subjected to pressure.

A still further object of my invention is to provide an extruder apparatus which shall embody improved mechanical features including positive and automatic feeding means integral therewith, insuring that the material being extruded shall reach the perforated extruder plate free of voids; means whereby the material passing through the plate may be cooled and partially dried to permit immediate handling; improved means for supporting and for readily exchanging the extruder plate as well as many other advantages which will become apparent from a consideration of this specification.

In the production of chemical salts it is often desirable to form denser, more uniform particle sizes than can be produced by the usual procedure of crystallization and drying. Where mixtures of different salts are made and marketed, it is practically impossible by any hitherto known means to obtain mixtures which are uniformly proportioned throughout a given mass. Furthermore, the differences in densities and specific gravities of different salts in a loose mixture leads to segregation and stratification in handling, thus destroying the uniformity of proportioning which may have existed when the mixture was first made.

The difficulties in producing uniform products of the character just mentioned have long been recognized and various means of overcoming them have heretofore been practiced, such for example as by spray drying a solution or suspension of the salts or by producing a solidified mixture followed by disintegration.

So far as I am aware, it has heretofore been considered practically impossible to extrude a salt paste in the form of relatively small dense particles. This is due to the fact that salt pastes derive their plasticity or softness from the excess of their saturated solutions mixed through the mass, and any appreciable pressure causes the softening solution to be squeezed out and segregated, leaving a hard dense mass of the moist salt that is not mobile and will not flow at any pressure.

On the other hand, materials ordinarily extruded, such as macaroni, rubber and metals, derive their plasticity from working or heating or both and the degree of plasticity is little changed within a range of pressures of a few pounds to thousands of pounds per square inch.

To illustrate the difficulty of extruding a paste formed from a mixture of salts, I have produced a mixture of ammonium phosphate and potash salts by grinding the salts to a fineness less than 120 mesh, incorporating from 5 to 10% of water, and kneading the paste thus formed until it was in a dough-like condition. Such a paste, when placed upon a perforated plate in a mass no greater than ½ inch in thickness, and subjected to static pressure up to 20,000 pounds per square inch, did not pass through the perforations in the plate but became compact into a block of rock-like hardness, the solution being driven out and separated from the salts with which it was previously intimately mixed.

I have discovered that salt mixtures such as described may be readily extruded with a relatively high rate of extrusion, if the paste may be maintained in motion and have its moving mass subjected to a dynamic pressure immediately it comes in contact with the perforated plate through which it is to be extruded. I have found that this pressure may be applied to the material in motion as it approaches the perforated plate of the extruder by imparting a wiping effect upon the material immediately over the perforations in the extruder plate. Such effect is distinguished from the ordinary method of extrusion as heretofore known to me in that with prior art practice, the material to be extruded is subjected to a static pressure as by a plunger bearing against the whole mass being fed and extruded, or by a screw feed having a substantially constant pitch and uniform working face of the screw flights whereby the material is in an appreciably thick mass on the perforated plate and is subjected to a pressure analogous to that of a plunger.

In designing the apparatus for carrying out this principle of extrusion discovered by me, I provide a screw fitting snugly within a compression chamber having helical grooves therein, to more positively propel the material to the perforated plate which closes the end of the compression chamber. The screw itself is modified from ordinary extruder screws with which I am familiar in that the working faces of the flights, which are of a relatively flat pitch and oppositely inclined to the grooves in the walls of the extrusion chamber, are formed to provide a radial component of motion to the point where they immediately overhang the extrusion plate. At this point, the flights are gradually changed from a lateral curvature, merging into a radial plane at the terminus of the flights. At their respective termini the so converging flights are substantially in contact with the plate whereby to produce a substantially wholly axial force upon the material and with a final wiping effect on the material. The effect of this design is that only a relatively small mass of material is at one time subjected to a force sufficient to extrude it through the perforated plate, which force is controlled within the limitation of the critical pressure at which the salts separate from their paste forming solutions. This material, being in motion and subjected to the pressure of extrusion by reason of the moving terminus of the screw being substantially in contact with the plate, is consequently acted upon by a dynamic pressure as distinguished from a static pressure.

In my application, Serial No. 558,669, filed August 22, 1931, I have illustrated and described a process for producing homogeneous mixtures of fertilizer salts in the form of relatively dense hard particles of uniform size and in which the fertilizer salt mixtures are produced by forming a paste of the same and extruding it, followed by drying and sizing. The method and apparatus herein disclosed is especially adapted for carrying out the extrusion step of my invention aforesaid, but it will be apparent that it is equally well adapted for the extrusion of a wide variety of salts and salt mixtures.

Apparatus embodying features of my invention is illustrated in the accompanying drawings, forming a part of this application, wherein:

Fig. 1 is a vertical sectional view through my improved extruder;

Fig. 2 is a sectional view taken along the line II—II of Fig. 1;

Fig. 3 is a sectional view taken along the line III—III of Fig. 1;

Fig. 4 is a fragmentary detail sectional view showing the terminus of a screw flight;

Fig. 5 is a fragmentary plan view of the bottom of the screw;

Figs. 6 to 11, inclusive are sectional views taken along the lines VI—VI, VII—VII, VIII—VIII, IX—IX, X—X, and XI—XI, respectively, of Fig. 5;

Fig. 12 is a transverse sectional view through the compression chamber of my improved extruder; and Fig. 13 is a fragmentary plan view of the extruder plate.

Referring to the drawings for a better understanding of my invention, I show a hopper 10 into which material to be extruded may be charged through a side opening 11 and which terminates at the bottom in a conical feed chamber 12. Connected to the conical feed chamber 12 is a cylindrical compression chamber 13, the outer end of which is closed by a perforated extruder plate 14.

In the practical carrying out of my invention, I have found that there is a relation between the diameter of the perforations shown at 16 in Fig. 13 and the thickness of the plate which must be observed in order to form extruded particles of uniform diameter and density. For example, in the extrusion of plant nutrient salts such as ammonium phosphate and potash salts, I have found that a diameter of $\frac{5}{64}$ inch for the perforations of the plate is a satisfactory size. With perforations of this diameter, they should not extend through the plate more than $\frac{3}{16}''$ nor less than $\frac{1}{8}''$ to produce satisfactory results.

Disposed within feed chamber 12 and compression chamber 13 is a screw 17 having its portion within the feed chamber of a conical form and having its portion within the compression chamber 13 of a cylindrical form snugly fitting the compression chamber. Since the spaces between the flights in the conical section of this screw are greater in volume than the corresponding spaces in the cylindrical section thereof, it is necessary to provide means for prevention of the paste, under treatment, reaching its critical separation pressure in the latter spaces. This is accomplished by providing the clearance shown between the outer edge of the conical screw flights, and the inner surface of the conical feed chamber in substantial parallelism therewith.

As the paste feeds downward in the flight spaces of the conical screw section, its increment decreasing volume develops increasing pressure approaching the limits of its mobile consistency. This annular clearance space, however, supplies a relief channel by which the said paste passes back upwardly into the lower pressure zone, thus automatically maintaining an auxiliary closed circuit of pressure control within limits of its mobility.

The upper termini of the flights 18 of the screw 17, as seen in Fig. 3, are so disposed as to draw the material downwardly into the feed chamber and urge it toward the compression chamber and through the extruder plate.

The compression chamber 13 is provided in its walls with relatively steep pitched grooves 19 which are inclined oppositely to the flights 18 of the screw 17 so as to coact with the flights of the screw in forced propulsion of the material to the effective extrusion zone against the perforated extrusion plate.

The extruder plate 14 is preferably made rectangular in form, as shown in Fig. 13, and fits within a lateral groove 21 formed in a guideway 22 at the bottom of the compression chamber 13. Bearing upwardly against the plate 14 is a yoke 23 supported by bolts 24 and 26 carrying worm gear nuts 27.

Extending upwardly, centrally of the yoke 23 is a hollow central support 29 for the perforated plate 14. The central support 29 is carried by a hollow cross member 31 provided with an air passage 32 therein. The hollow supporting member 29 is provided with lateral ports 33 whereby material passing through the plate may be subjected to a current of air and dried and cooled sufficiently for immediate handling upon passing through the plate.

Coacting with the nuts 27 are worms 34 and 36 which are right and left hand respectively, and which are mounted upon a common shaft 37 carried by brackets 38 and 39 suitably secured to the yoke 23. By turning the shaft 37 the nuts 27 may be loosened or tightened simultaneously. Whenever it is desired to change the extruder plate 14, shaft 37 is turned to loosen the nuts 27, lowering the yoke 23 and loosening the plate 14. A new plate may then be inserted by pushing the rectangular plate outwardly through the guideways 21 with the plate being installed.

Surrounding the compression chamber 13 is a heat transfer medium jacket 41 having connections 42 and 43 whereby the temperature of the compression chamber may be controlled.

The screw 17 is connected to a shaft 44 mounted in bearings 46 carried by cross members 47 mounted in the upper end of the feed chamber 12. The shaft 44 extends upwardly and outwardly through the hopper 10 and has mounted on its upper end a worm gear 48 driven through a worm 49 from any suitable source of power. A thrust bearing 51 on the upper end of the shaft 44 serves to counteract the thrust of the materials being extruded.

Mounted on the shaft 44 in the hopper 10 are agitating blades 52 having downwardly turned scrapers 53 thereon to keep the material in a loose condition and moving downwardly toward the screw 17. I also preferably provide inclined feeder blades 54 on shaft 44 so as to insure free movement of the material between the bearing supporting members 47.

In order that the temperature of the material being extruded may be better controlled and in order to prevent undue heat being developed from friction, I make the shaft 44 and screw 17 hollow and provide a swivel connection 56 at the top of the shaft 44, said swivel connection having water inlets and outlets 57 and 58 respectively. The inlet 57 may communicate with a pipe 59 leading to the bottom of the hollow screw 17 whereby cooling water may be delivered to the bottom of the interior of the screw and rise upwardly through the interior counterbored space inside the screw flights and the hollow shaft 44 to be delivered through the outlet 58.

An important feature of my invention lies in the design of the screw flights 18 within the compression chamber 13. Inasmuch as only a limited volume of a salt paste can be subjected to extruding pressure at a time, it is necessary, where a screw of relatively large diameter is employed, to provide a screw with a plurality of flights. In the drawings, I have illustrated an extruder screw having a diameter of 15 inches within the compression chamber, and provided with four flights. It will be noted that each of the flights occupies about 1¼ turns around the screw within the compression chamber, which is substantially the maximum which may be employed in extruding salt paste. Where a greater number of turns are employed, I have found that an excess of pressure is produced between the flights, causing a separation of the salts from their solution and a packing and stoppage of the feed.

The feeding of the salts down to the extruder plate 14 is brought about by forming the flights as shown in Fig. 6 of the drawings, wherein the under or working face of the flight is shown with a lateral curvature 61 whereby to exert a radial component of force upon the material being extruded, causing it to coact with the grooves 19 in the walls of the compression chamber 13 and move toward the plate 14 without the development of excessive pressure. When the salt paste comes in immediate contact with the plate, it is then necessary to bring about the wiping effect or dynamic pressure sufficient to force it through the perforated plate 14. This is illustrated in Figs. 5 to 11.

In Fig. 5 the bottom plan view of the screw 17 shows the termini of the flights 18. With a four flight screw as shown, it is obvious that the terminus of each flight is acting upon a relatively small volume of paste around ¼ of the circumference of the screw. In order to bring about the wiping effect upon the paste heretofore referred to, I modify the contour of the working face of the flight from the point immediately overhanging the perforated plate to its terminus. With a four flight screw, this modification would begin with each flight at ninety degrees from the terminus; with a three flight screw, at one hundred twenty degrees, and so on.

Fig. 7 shows the modification of the contour of the working face along the line VII—VII of Fig. 5 and nearer the terminus of the screw than the point at which Fig. 6 is taken. It will be noted in this figure that instead of the rounded underface such as 61 in Fig. 6, the underface has been flattened somewhat as at 62 so as to exert an increasingly axial component of force upon the material being extruded.

Figs. 8 and 9, taken along the lines VIII—VIII and IX—IX of Fig. 5, show the working face flattened to a greater extent, as shown at 63 and 64, until at the point where Fig. 9 is taken the screw is exerting very little radial force upon the material.

As the terminus 67 of the screw is approached, as shown in Figs. 4, 10, and 11 the curvature of the working face of the flight entirely disappears so that the working face of the flight lies in a radial plane 66 with respect to the axis of rotation of the screw. Also as shown in Figs. 4 and 11, the terminus 67 is substantially in contact with the perforated extruder plate. When extruding salts through perforations $\frac{5}{64}$" diameter, I have found that the length thereof should not exceed $\frac{3}{64}$" to permit forcing the paste therethrough with limits of critical pressure of homogeneous consistency of said salts and solutions, and that this length of perforation should be not less than ⅛" in order to form the desired density and uniformly smooth surface of the extruded section. I have found that the clearance between the end of the screw and the plate should not exceed $\frac{1}{16}$" and is preferably around $\frac{1}{64}$".

From a consideration of the design of screw flights just described, it will be seen that material lying in the spaces between the flights 18 of the rotating screw 17 is carried downwardly to the extruder plate while in rotary motion, and while still in motion and in immediate contact with the perforated plate has exerted thereupon a powerful axial component of motion which causes it to be forced through the perforations in the plate without separation of the salts from their solutions and consequently without the caking and hardening of the salts between the flights and consequent stoppage of feed.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In an extruder, means defining a compression chamber, a feed screw fitting snugly within the compression chamber, a perforated plate closing the end of the compression chamber, a feed screw having a flight thereon limited to 1¼ turns in said compression chamber with a laterally curved working surface remote from the plate merging into a terminal radial line working surface closely adjacent the plate and substantially parallel thereto.

2. In an extruder, means defining a compression chamber having grooves in the wall thereof, a die plate closing the outer end of the compression chamber, a relatively flat pitched feed screw fitting snugly within the compression chamber, a flight on the feed screw having its working face on the side toward the die plate laterally curved to coact with the grooves in the wall of the compression chamber for feeding the material toward the terminus of the screw, said working face toward its terminus gradually changing from a lateral curvature to a flat surface and being adapted at its terminus to exert a wiping effect on the material being extruded.

3. In an extruder, means defining a compression chamber having relatively steep pitched helical grooves in the wall thereof, a die plate closing the outer end of the compression chamber, a relatively flat pitched feed screw fitting snugly within the compression chamber, a flight on the feed screw oppositely inclined with respect to the helical grooves and having a laterally curved working face on the side toward the die plate to coact with the grooves in the wall of the compression chamber for feeding the material toward the terminus of the screw, said working face toward its terminus gradually changing from a lateral curvature to a flat surface and being adapted at its terminus to exert a wiping effect on the material being extruded.

4. In an extruder, a compression chamber, a die plate closing one end of the compression chamber, a feed chamber larger in diameter than the compression chamber, a screw having an enlarged conical portion in the feed chamber merging into a straight portion snugly fitting in the compression chamber, and a flight on the screw terminating in substantial contact with the die plate.

5. In an extruder, a compression chamber, a die plate closing one end of the compression chamber, a feed chamber larger in diameter than the compression chamber, a screw having an enlarged conical portion in the feed chamber merging into a straight portion snugly fitting in the compression chamber, a flight on the screw terminating in substantial contact with the die plate, a closed feed hopper above and communicating with said feed chamber, a hollow shaft driving said screw and extending in gas tight sealed means through said hopper, and heat transfer medium passage through said hollow shaft to interior space to terminus of said screw.

6. In an extruder, a compression chamber, a die plate closing one end of the compression chamber, a feed chamber larger in diameter than the compression chamber, a screw having an enlarged conical portion in the feed chamber merging into a straight portion snugly fitting in the compression chamber, a flight on the screw terminating in substantial contact with the die plate, a closed feed hopper above and communicating with said feed chamber, a hollow shaft driving said screw and extending in gas tight sealed means through said hopper, means defining a heat transfer medium passage through said hollow shaft to interior space to terminus of said screw, and propelling arms about said shaft in said feed hopper.

7. In an extruder, a compression chamber, a die plate closing one end of the compression chamber, a feed chamber larger in diameter than the compression chamber, a screw having an enlarged conical portion in the feed chamber merging into a straight portion snugly fitting in the compression chamber, and a flight on the screw terminating in substantial contact with the die plate and having its working face on the side toward the die plate terminating in a flat surface.

8. In an extruder, a compression chamber, a die plate closing one end of the compression chamber, a feed chamber larger in diameter than the compression chamber, a screw having an enlarged conical portion in the feed chamber merging into a straight portion snugly fitting in the compression chamber, and a flight on the screw having its working face laterally curved remote from the die plate and gradually changing from said lateral curvature to a flat surface at its terminus.

9. In an extruder, a conical feed chamber, a cylindrical compression chamber connected to the feed chamber, a feed screw having a conical portion loosely fitting in the feed chamber and merging into a straight portion snugly fitting the compression chamber, a perforated plate closing the outer end of the compression chamber, flights on the feed screw terminating substantially in contact with the perforated plate, a hollow central supporting means for the perforated plate and having lateral openings therein, and means for passing an air current through said support.

10. In an extruder, a conical feed chamber, a cylindrical compression chamber connected to the feed chamber, a feed screw having a conical portion loosely fitting in the feed chamber and having increment pitch increasing with conical extension of flights to radial termini in rotary plane at right angles with its axis and merging into a straight portion snugly fitting the compression chamber, a perforated plate closing the outer end of the compression chamber, flights on the feed screw terminating substantially in contact with the perforated plate, a hollow central supporting means for the perforated plate and having lateral openings therein, and means for passing an air current through said support contacting surface of said plate.

11. In an extruder, a compression chamber, a screw fitting in the compression chamber, a perforated late closing the outer end of the compression chamber, a hollow central supporting means for the perforated plate and having lateral ports therein, and means for passing an air current through said support.

12. In an extruder embodying a perforated die plate and a rotary screw for forcing material through said die plate, a flight on the screw having its working face remote from and on the side toward the die plate curved to exert a radial component of force on the material being extruded, and gradually changing from the more remote portion thereof immediately opposite the die plate to a form exerting substantially a wholly axial force on the material being extruded.

13. In an extruder embodying a perforated die plate and a rotary screw for forcing material through said die plate, a flight on the screw having its working face remote from and on the side toward the die plate curved to exert a radial component of force on the material being extruded, said curvature being gradually decreased from the point where the flight is immediately opposite the die plate to its terminus until the working face of said flight lies at its terminus substantially in a radial plane to the axis of rotation of said screw.

14. In an extruder embodying a perforated die plate and a rotary screw for forcing material through said die plate, a flight on the screw having its working face remote from and on the side toward the die plate curved to exert a radial component of force on the material being extruded, said curvature being gradually decreased from the point where the flight is immediately opposite the die plate to its terminus until the working face of said flight lies at its terminus substantially in a radial plane to the axis of rotation of said screw and in substantially close contact with said plate.

15. The method of extruding a paste formed from salts in solutions of the same through a die plate which comprises subjecting said paste to a relatively low conveying pressure until the paste approaches the die plate, and increasing the pressure at the die plate to that necessary to extrude the paste.

16. The method of extruding a paste formed from inorganic salts in solutions of the same through a die plate which comprises subjecting said paste to a relatively low conveying pressure until the paste approaches the die plate and increasing the pressure on the paste at the die plate until it approaches that at which the salts separate from their solutions.

17. The method of extruding a paste of salts through a perforated die plate which consists in subjecting said salts to a pressure below that at which said salts separate from their solutions to convey them to the perforated plate, and then subjecting the salts in contact with the plate to a wiping action to increase the pressure and to force them through the perforations.

18. The method of extruding a paste of salts through a perforated die plate which consists in subjecting said salts to a relatively low conveying pressure to bring them in contact with the plate and then subjecting the salts in contact with the plate to a relatively higher dynamic pressure to force them through the plate.

BETHUNE G. KLUGH.